G. W. LINDLEY.
CORD FABRIC.
APPLICATION FILED JAN. 20, 1920.
1,374,668.
Patented Apr. 12, 1921.
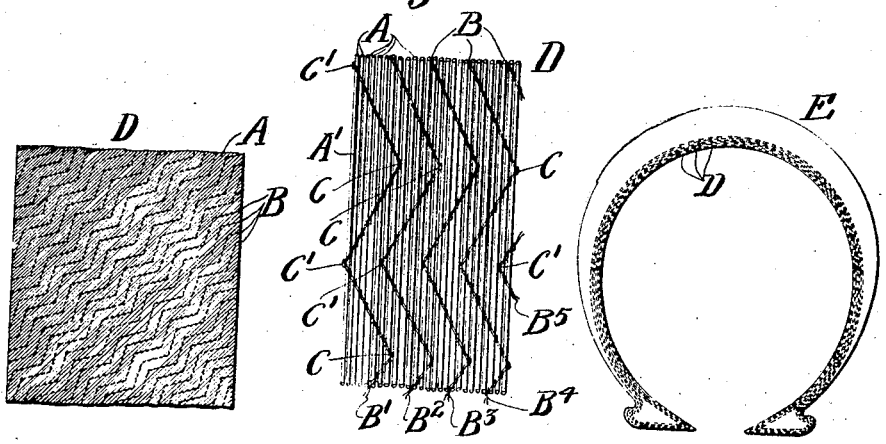
Fig. 1.
Fig. 3.
Fig. 4.
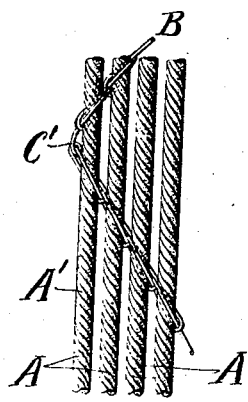
Fig. 2.
WITNESSES:
Gustav Genzlinger
INVENTOR
George W. Lindley
BY
Francis D. Chambers
his ATTORNEY

UNITED STATES PATENT OFFICE.

GEORGE W. LINDLEY, OF PHILADELPHIA, PENNSYLVANIA.

CORD FABRIC.

1,374,668. Specification of Letters Patent. Patented Apr. 12, 1921.

Application filed January 20, 1920. Serial No. 352,655.

*To all whom it may concern:*

Be it known that I, GEORGE W. LINDLEY, a citizen of the United States of America, residing in the city and county of Philadelphia, in the State of Pennsylvania, have invented certain new and useful Improvements in Cord Fabrics, of which the following is a true and exact description, reference being had to the accompanying drawings, which form a part thereof.

My invention relates to cord fabrics especially intended and adapted for use in the manufacture of pneumatic tires, the object of my invention being to provide a fabric consisting of longitudinally running parallel cords held in place in and incorporated in the fabric by transversely running lines of knitted threads, in the loops of which threads cords lie, and by preference, and as what I believe to be the best construction, the knitted threads also run longitudinally of the fabric and are given the necessary transverse extension across the cords which are knit into them by running the knitted threads in a series of zigzags so disposed in the fabric that one or more of the longitudinally running cords are engaged by each two adjacent lines of zigzag knitted threads.

The nature of my improvement will be best understood as described in connection with the drawings in which it is illustrated and in which—

Figure 1 is a face view of a portion of the fabric constructed in accordance with my invention.

Fig. 2 is an enlarged face view illustrating in greater detail the mode of incorporation of the longitudinally running cords in the zigzag lines of knitted thread.

Fig. 3 is a face view of a portion of one of the strips cut from the fabric for use in the makeup of a pneumatic tire, and Fig. 4 is a sectional cross section of a pneumatic tire showing the disposition of the fabric layers in the tire.

D, Fig. 1, indicates the fabric as a whole, said fabric being made of a series of parallel longitudinally running cords A, A, etc., the cord on the outer or the selvage edge of the fabric being indicated at A'. B, B, etc., indicate the lines of knitted threads; these knitted threads shown in Fig. 1 of the drawing being further indicated by the individual symbols B', $B^2$, $B^3$, $B^4$ and $B^5$. As shown, the knitted threads as a whole may be said to run longitudinally of the fabric and they are given the necessary transverse extension across the fabric and cross cords incorporated in the fabric by zigzaging the knitted threads between points indicated at C and C', the threads being so disposed that one or more of the cords of the fabric are incorporated in two adjacent lines of knitted threads, as is clearly indicated in Fig. 1, at the corners of the zigzag marked C and C'. E is a conventional representation of a pneumatic tire, the overlying layers of the fabric used in the construction of the tire being indicated at D, and it will be understood that in using my improved fabric in the manufacture of tires strips are cut from the fabric on the bias as is indicated in the section of such a strip shown in Fig. 3, the cords running obliquely from edge to edge of the tire and the overlying strips being so arranged as to cross each other, as is shown, in the manufacture of cord tires.

It will be understood that my improved fabric, by incorporating the cords in the loops of the knitted threads, secures a correct and permanent alinement of the cords with reference to each other, and it will further be obvious that this construction, in which the cords run longitudinally through the fabric, is especially well adapted to be cut up into strips by obliquely running lines of severance; this mode of construction forming a material advance over my former construction shown and described in my pending application for Letters Patent filed September 18, 1919, Serial No. 324,292, in which the fabric used consists of transversely running cords held together by parallel longitudinally running rows of knitted threads.

Having now described my invention, what I claim as new and desire to secure by Letters Patent, is:

1. A non-elastic cord fabric suitable for use in the manufacture of pneumatic tires, said fabric being of closely and evenly spaced longitudinally running warps consisting of parallel cords held parallel to each other and incorporated into a fabric by transversely running threads relatively widely spaced apart and each knitted into a series of enchained loops, each of which loops is thrown around and firmly grips a cord.

2. A cord fabric consisting of a series of parallel cords running longitudinally in the fabric in combination with a series of threads each knitted into a series of enchained loops, said knitted threads running longitudinally in the fabric in a series of transverse zigzag steps and incorporating a cord in each of its loops the transverse zigzag steps of the knitted threads being so disposed that adjacent rows of knitted threads will engage in their loops one or more of the same longitudinally running cords and thus incorporate all of the cords in the fabric.

GEORGE W. LINDLEY.